(12) United States Patent
Wang et al.

(10) Patent No.: US 12,150,170 B2
(45) Date of Patent: Nov. 19, 2024

(54) METHOD AND APPARATUS FOR LISTEN-BEFORE-TALK (LBT) RELATED OPERATION IN A WIRELESS COMMUNICATION SYSTEM USING UNLICENSED BAND

(71) Applicant: Samsung Electronics Co., Ltd., Suwon-si (KR)

(72) Inventors: Yi Wang, Beijing (CN); Yingyang Li, Beijing (CN); Shichang Zhang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/739,812

(22) Filed: May 9, 2022

(65) Prior Publication Data
US 2022/0264637 A1    Aug. 18, 2022

Related U.S. Application Data

(63) Continuation of application No. 16/488,782, filed as application No. PCT/KR2018/003386 on Mar. 22, 2018, now Pat. No. 11,330,624.

(30) Foreign Application Priority Data

Mar. 24, 2017   (CN) .......................... 201710187125.3
Jul. 7, 2017    (CN) .......................... 201710555342.3
Aug. 10, 2017   (CN) .......................... 201710683187.3

(51) Int. Cl.
*H04L 1/1812*   (2023.01)
*H04L 1/1867*   (2023.01)
(Continued)

(52) U.S. Cl.
CPC ........... *H04W 74/02* (2013.01); *H04L 1/1812* (2013.01); *H04L 1/1896* (2013.01); *H04W 16/14* (2013.01);
(Continued)

(58) Field of Classification Search
CPC . H04W 74/02; H04W 16/14; H04W 72/1268; H04W 72/23; H04W 74/006;
(Continued)

(56) References Cited

U.S. PATENT DOCUMENTS

2013/0114570 A1*  5/2013  Park .................. H04W 72/0446
                                                        370/335
2016/0192388 A1*  6/2016  Ekpenyong .......... H04L 1/1829
                                                        370/329
(Continued)

FOREIGN PATENT DOCUMENTS

CN          106211345 A      12/2016
WO       2016/071741 A1       5/2016
(Continued)

OTHER PUBLICATIONS

Santana et al., "Performance of License Assisted Access Solutions Using ns-3," 2016 International Conference on Computational Science and Computational Intelligence (CSCI), Las Vegas, NV, USA, 2016, pp. 941-946 (Year: 2016).*
(Continued)

*Primary Examiner* — Un C Cho
*Assistant Examiner* — Lalita W Pace
(74) *Attorney, Agent, or Firm* — Jefferson IP Law, LLP

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to
(Continued)

intelligent services based on the 5G communication technology and the IoT-related technology, such as smart home, smart building, smart city, smart car, connected car, health care, digital education, smart retail, security and safety services. The present disclosure provides a method for monitoring a carrier and transmitting a signal over an unlicensed band.

10 Claims, 8 Drawing Sheets

(51) Int. Cl.
| | |
|---|---|
| *H04W 16/14* | (2009.01) |
| *H04W 72/1268* | (2023.01) |
| *H04W 72/23* | (2023.01) |
| *H04W 74/00* | (2009.01) |
| *H04W 74/02* | (2009.01) |
| *H04W 74/04* | (2009.01) |
| *H04W 74/08* | (2009.01) |
| *H04W 74/0808* | (2024.01) |

(52) U.S. Cl.
CPC ....... *H04W 72/1268* (2013.01); *H04W 72/23* (2023.01); *H04W 74/006* (2013.01); *H04W 74/04* (2013.01); *H04W 74/08* (2013.01); *H04W 74/0808* (2013.01)

(58) Field of Classification Search
CPC . H04W 74/04; H04W 74/08; H04W 74/0808; H04W 74/004; H04W 72/21; H04W 74/0816; H04L 1/1812; H04L 1/1896; H04L 1/1887; H04L 1/1822
See application file for complete search history.

(56) References Cited

U.S. PATENT DOCUMENTS

| | | |
|---|---|---|
| 2016/0198450 A1 | 7/2016 | Wei et al. |
| 2017/0019909 A1 | 1/2017 | Si et al. |
| 2017/0202022 A1 | 7/2017 | Chendamarai Kannan et al. |
| 2017/0318607 A1 | 11/2017 | Tiirola et al. |
| 2018/0027549 A1 | 1/2018 | Wang et al. |
| 2018/0123744 A1 | 5/2018 | Nogami et al. |
| 2018/0160447 A1 | 6/2018 | Noh et al. |
| 2018/0175975 A1 | 6/2018 | Um et al. |
| 2018/0227936 A1 | 8/2018 | Yerramalli et al. |
| 2018/0249484 A1 | 8/2018 | Kim et al. |
| 2018/0288790 A1 | 10/2018 | Kim et al. |
| 2019/0014596 A1 | 1/2019 | Yang et al. |
| 2019/0149270 A1* | 5/2019 | Liu ................. H04L 12/4035 370/329 |
| 2019/0159243 A1 | 5/2019 | Tao et al. |
| 2019/0159253 A1 | 5/2019 | Koorapaty et al. |
| 2019/0182865 A1 | 6/2019 | Falahati et al. |
| 2019/0342037 A1 | 11/2019 | Karaki et al. |
| 2019/0349908 A1* | 11/2019 | Talarico ................ H04W 72/23 |
| 2020/0106565 A1 | 4/2020 | Li et al. |
| 2020/0404706 A1 | 12/2020 | Karaki et al. |

FOREIGN PATENT DOCUMENTS

| | | |
|---|---|---|
| WO | 2017/030417 A1 | 2/2017 |
| WO | 2017/150911 A1 | 9/2017 |

OTHER PUBLICATIONS

"Dynamic," Web page <https://www.merriam-webster.com/dictionary/dynamic>, 2 pages, Jan. 27, 2017, retrieved from Internet Archive Wayback Machine <http://web.archive.org/web/20170127001334/https://www.merriam-webster.com/dictionary/dynamic>. (Year: 2017).*
Huawei et al., 'Signaling for UL LBT parameters for eLAA', R1-166134, 3GPP TSG RAN WG1 Meeting #86, Gothenburg, Sweden, Aug. 12, 2016, See pp. 1-5, Aug. 12, 2016.
Qualcomm Incorporated, 'Remaining details of UL LBT', R1-166255, 3GPP TSG RAN WG1 Meeting #86, Gothenburg, Sweden, Aug. 13, 2016, See pp. 1-8, Aug. 13, 2016.
Ericsson, 'On contention window adjustment for category 4 UL LBT', R1-167723, 3GPP TSG RAN WG1 Meeting #86, Gothenburg, Sweden, Aug. 13, 2016, See pp. 1-6, Aug. 13, 2016.
Ericsson, 'On autonomous UL transmissions for NR in unlicensed spectrum', R1-1703306, 3GPP TSG RAN WG1 Meeting #88, Athens, Greece, Feb. 7, 2017, See pp. 1-3, Feb. 7, 2017.
Huawei, HiSilicon, LBT Operation for LAA Uplink, R2-151175, 3GPP TSG-RAN WG2 Meeting #89bis, Bratislava, Slovakia, Oct. 19, 2016.
Chinese Office Action dated Oct. 13, 2022, issued in Chinese Patent Application No. 201710683187.3.

* cited by examiner

FIG. 2
(Prior Art)

| LBT Priority Class | n | $CW_{min}$ | $CW_{max}$ | MCOT | CWS Set |
|---|---|---|---|---|---|
| 1 | 2 | 3 | 7 | 2ms | {3,7} |
| 2 | 2 | 7 | 15 | 4ms | {7,15} |
| 3 | 3 | 15 | 1023 | 6ms or 10 ms | {15,31,63,127,255,511,1023} |
| 4 | 7 | 15 | 1023 | 6ms or 10 ms | {15,31,63,127,255,511,1023} |

METHOD AND APPARATUS FOR LISTEN-BEFORE-TALK (LBT) RELATED OPERATION IN A WIRELESS COMMUNICATION SYSTEM USING UNLICENSED BAND

CROSS-REFERENCE TO RELATED APPLICATION(S)

This application is a continuation application of prior application Ser. No. 16/488,782, filed on Aug. 26, 2019, which is a U.S. National Stage application under 35 U.S.C. § 371 of an International application number PCT/KR2018/003386, filed on Mar. 22, 2018, which is based on and claims priority of a Chinese patent application number 201710187125.3, filed on Mar. 24, 2017, in the Chinese Patent Office, of a Chinese patent application number 201710555342.3, filed on Jul. 7, 2017, in the Chinese Patent Office, of a Chinese patent application number 201710683187.3, filed on Aug. 10, 2017, in the Chinese Patent Office, the disclosure of each of which is incorporated by reference herein in its entirety.

TECHNICAL FIELD

The present disclosure relates to mobile communications, and more particularly, to a method for monitoring a carrier and transmitting a signal over an unlicensed band and a corresponding device.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Due to the increasingly acute conflict between the rapid growth of user demands for broadband wireless traffic and the scarce spectrum resources, mobile operators have considered license-free bands (also referred to as unlicensed bands) as supplements to licensed bands. The 3rd Generation Partnership Project (3GPP) has started researches on how to improve overall spectral utilization of the network effectively by means of efficient carrier aggregation between unlicensed bands and licensed bands when deploying Long Term Evolution (LTE) over the unlicensed bands (the LTE system deployed over unlicensed bands is referred to as License Assisted Access (LAA) system), while avoiding significant impact on other techniques over the unlicensed bands. As shown in FIG. 1, there are two transmitting nodes serving a User Equipment (UE) simultaneously: one providing large coverage and stable connectivity via a licensed band and the other providing a hot spot service via an unlicensed band. Both transmitting nodes belong to one single base station and may or may not be co-located. Alternatively, the two transmitting nodes can belong to different base stations, i.e., operating in a Dual Connectivity (DC) mode.

Typically, unlicensed bands have been assigned for some other purpose, e.g., radar or Wireless Fidelity (WiFi) in the 802.11 family. It is critical to avoid mutual interference between the LAA system and the other wireless systems such as radar or WiFi. Clear Channel Assessment (CCA) is a mechanism for conflict avoidance that is commonly used in unlicensed bands. A mobile station, or STA, has to detect a wireless channel before transmitting a signal. It can only occupy the wireless channel for transmitting the signal when the wireless channel is detected as clear. Such mechanism is also known as Listen Before Talk (LBT). The LAA also needs to follow the LBT mechanism to perform energy detection for channels.

Before transmitting any signal, a LAA UE needs to receive an uplink (UL) grant from an evolved NodeB (eNB) and perform LBT prior to the UL subframe indicated in the UL grant. Before transmitting the UL grant on an unlicensed band, the eNB needs to perform downlink (DL) LBT and can only transmit the UL grant when the DL LBT has succeeded. The UE needs to perform UL LBT before transmitting in the UL subframe scheduled by the UL grant and can only transmit a Physical Uplink Shared Channel (PUSCH) scheduled by the UL grant when the UL LBT has succeeded. There are two categories of UL LBTs that can be performed by the UE. In the first category of LBT, also known as Category 4 LBT (TS 36.213 15.2.1.1), a Contention Window Size (CWS) is determined and a back-off factor, X, is generated randomly. A signal can be transmitted if all of X CCA slots are idle. The first category of LBT can be divided into four LBT priority classes corresponding to different Quality Criterion Indicators (QCIs). Different LBT priority classes have different CWSs, different defer periods, and different Maximum Channel Occupancy Time (MCOT), as shown in FIG. 2. The base station decides the category of LBT used by the LAA UE for transmission and the LBT priority class, and ensures that the subframe time occupied by the scheduled UL transmission from the LAA UE would not exceed the time required for the traffic associated with the indicated LBT priority class or a LBT priority class higher than (i.e., having a lower LBT priority class number than) the indicated LBT priority class. The category of traffic actually transmitted by the UE (corresponding to the QCI) is not limited. The UE can simply transmit the traffic within the allocated time according to the instruction from the eNB.

For the second category of LBT (TS 36.213 15.2.1.2), the UE only needs to perform a CCA detection of 25 us before transmitting a signal, as specified in the standard. It can transmit the signal if the channel is clear.

For the UL transmission scheduled based on the UL grant, the UE can only transmit a PUSCH when both the DL LBT by the eNB and the UL LBT by the UE have succeeded, which significantly reduces the chances of transmission. Hence, the 3GPP has considered UL transmissions based on autonomous uplink access over unlicensed bands.

DISCLOSURE OF INVENTION

Technical Problem

In a UL transmission scheduled based on a UL grant, a LBT priority class is indicated in the UL grant and the proper scheduled time is guaranteed by a base station. However, this is impossible when autonomous uplink access is applied due to lack of the information. Therefore, a new solution is needed.

Further, since the autonomous uplink access and the scheduled UL transmission have different capabilities in preempting channels, their difference should be considered when determining LBT parameters.

Solution to Problem

According to an aspect of the present disclosure, a method for autonomous uplink transmission is provided. The method includes: obtaining Listen Before Talk (LBT) information; determining an LBT parameter based on the LBT information and determining a transmission parameter for autonomous uplink transmission; and performing an LBT operation based on the determined LBT parameter and determining whether a signal can be transmitted over an autonomous uplink transmission resource based on the transmission parameter.

In an embodiment, the operation of determining the LBT parameter includes: determining energy detection thresholds for the autonomous uplink transmission and a scheduled uplink transmission, respectively.

In an embodiment, the operation of determining the LBT parameter includes: determining Contention Window Sizes (CWSs) for the autonomous uplink transmission and a scheduled uplink transmission, separately or partially separately.

In an embodiment, the operation of determining the CWSs separately or partially separately includes: for uplink transmissions associated with one single Hybrid Automatic Repeat reQuest (HARQ) process, determining the CWSs for the autonomous uplink transmission and the scheduled uplink transmission, respectively; for uplink transmissions associated with one single HARQ process, using ACK/NACK corresponding to the autonomous uplink transmission for adjusting the CWS for the scheduled uplink transmission, while not using ACK/NACK corresponding to the scheduled uplink transmission for adjusting the CWS for the autonomous uplink transmission; and for uplink transmissions associated with one single HARQ process, using ACK/NACK corresponding to the scheduled uplink transmission for adjusting the CWS for the autonomous uplink transmission, while not using ACK/NACK corresponding to the autonomous uplink transmission for adjusting the CWS for the scheduled uplink transmission.

In an embodiment, the operation of determining the LBT parameter includes: determining numbers, K, of times a maximum value, $CW_{max,p}$, of Contention Window (CW) is used consecutively for the autonomous uplink transmission and a scheduled uplink transmission, respectively.

In an embodiment, the transmission parameter includes: a time parameter or a frequency-domain parameter of the autonomous uplink transmission resource, an indication indicating whether the transmission can be performed or a traffic type of the uplink transmission.

In an embodiment, the operation of determining whether the signal can be transmitted over the autonomous uplink transmission resource based on the transmission parameter includes: determining whether the signal can be transmitted over a selected autonomous uplink transmission resource based on a category of LBT.

In an embodiment, a threshold, Thr1, is configured for a first category of LBT and a threshold, Thr2, is configured for a second category of LBT, where Thr1<Thr2, such that a probability that a User Equipment (UE) generates a random number larger than Thr1 is higher than a probability that the UE generates a random number larger than Thr2.

In an embodiment, the operation of determining the transmission parameter includes: determining whether the signal can be transmitted over a selected autonomous uplink transmission resource based on an LBT priority class.

In an embodiment, thresholds are configured for different LBT priority classes, respectively, such that traffic associated with a higher LBT priority class is transmitted at a higher probability.

In an embodiment, the LBT indication information is obtained via Common-Physical Downlink Control Channel (C-PDCCH) or higher layer signalling.

In an embodiment, the parameter for the autonomous uplink transmission is configured for different LBT priority classes and the autonomous uplink transmission resource is selected by a UE based on an LBT priority class.

In an embodiment, the operation of determining the LBT parameter includes: using only a first category of LBT for the autonomous uplink transmission.

In an embodiment, the operation of determining the LBT parameter includes: using a second category of LBT in response to receiving Maximum Channel Occupancy Time (MCOT) indication information, when an uplink subframe to be used for the autonomous uplink transmission is located within a set of uplink subframes indicated in the MCOT indication information.

In an embodiment, the operation of determining the transmission parameter for the autonomous uplink transmission includes: determining an LBT priority class for a downlink transmission having a current Maximum Channel Occupancy Time (MCOT) based on LBT information indicated in a Common-Physical Downlink Control Channel (C-PDCCH) when the autonomous uplink transmission uses a second category of LBT; determining a time length of the autonomous uplink transmission based on the LBT priority class; and/or determining a Quality Criterion Indicator (QCI) for a traffic type associated with the autonomous uplink transmission based on the LBT priority class.

In an embodiment, the operation of determining the transmission parameter for the autonomous uplink transmission includes: determining an LBT priority class available for the autonomous uplink transmission within a current Maximum Channel Occupancy Time (MCOT) based on LBT information indicated in a Common-Physical Downlink Control Channel (C-PDCCH) when the autonomous uplink transmission uses a second category of LBT; and/or determining a time length of the autonomous uplink transmission based on the LBT priority class.

According to another aspect of the present disclosure, a User Equipment (UE) is provided. The UE includes: an obtaining unit configured to obtain Listen Before Talk (LBT) information; a determining unit configured to determine an LBT parameter based on the LBT information and determine a transmission parameter for autonomous uplink transmission; and an LBT operating unit configured to perform an LBT operation based on the determined LBT parameter and determine whether a signal can be transmitted over an autonomous uplink transmission resource based on the transmission parameter.

According to a further aspect of the present disclosure, a method performed by a base station is provided. The method includes: configuring, for a User Equipment (UE), Listen Before Talk (LBT) information and/or a resource for autonomous uplink transmission; and transmitting the LBT information to the UE. Preferably, the LBT information can be transmitted via Common-Physical Downlink Control Channel (C-PDCCH) or higher layer signalling.

In an embodiment, the base station configures energy detection thresholds for the autonomous uplink transmission and a scheduled uplink transmission for the UE separately.

In an embodiment, the base station configures Contention Window Sizes (CWSs) for the autonomous uplink transmission and the scheduled uplink transmission for the UE, separately or partially separately.

In an embodiment, the base station configures numbers, K, of times a maximum value, $C_{max,p}$, of Contention Window (CW) is used consecutively for the autonomous uplink transmission and the scheduled uplink transmission for the UE separately.

In an embodiment, the Contention Window Sizes (CWSs) for the uplink transmissions for the UE can be determined based on ACK/NACK associated with a reference uplink subframe.

In an embodiment, the reference uplink subframe for adjusting the CWS for the autonomous uplink transmission for the UE is the first subframe in the first uplink burst based on a first category of LBT at least X subframes before a subframe to be transmitted by the UE.

In an embodiment, the base station configures for the UE a resource for the autonomous uplink transmission and LBT priority class information associated with the resource.

In an embodiment, the base station indicates to the UE an LBT priority class for a downlink transmission having a current Maximum Channel Occupancy Time (MCOT).

In an embodiment, the base station indicates to the UE an LBT priority class available for the autonomous uplink transmission within a current Maximum Channel Occupancy Time (MCOT).

In an embodiment, the base station indicates to the UE LBT priority class information for all HARQ processes for the autonomous uplink transmission via activation downlink control signalling.

In an embodiment, the base station indicates to the UE LBT priority class information for HARQ processes for the autonomous uplink transmission by scheduling a UL grant for the autonomous uplink transmission, dynamically scheduling a UL grant or indicating downlink control information for ACK/NACK.

In an embodiment, the base station activates/deactivates the autonomous uplink transmission via activation/deactivation downlink control signalling. The UE will attempt to perform LBT for transmitting activation/deactivation confirmation signalling in the first uplink subframe available for the autonomous uplink transmission within a predefined time window in response to receiving the activation/deactivation signalling.

With the solutions according to the present disclosure, when monitoring a carrier before transmitting a signal, a directional carrier monitoring can be applied, so as to avoid interference with other nodes in the unlicensed band and improve the system gain.

According to yet a further aspect of the present disclosure, a method for configuring and activation or deactivation an autonomous uplink transmission is provided. A base station transmits autonomous uplink transmission activation/deactivation indication signalling on a particular type of carrier, and/or receives autonomous uplink transmission activation/deactivation confirmation indication signalling on a particular type of carrier.

In an embodiment, the autonomous uplink transmission activation/deactivation indication signalling can activate/deactivate an autonomous uplink transmission on a carrier that is the same as or different from a carrier on which the signalling is transmitted.

In an embodiment, the autonomous uplink transmission activation/deactivation confirmation indication signalling can be transmitted in an uplink subframe within a predefined time window.

In an embodiment, the autonomous uplink transmission activation/deactivation confirmation indication signalling can use a category of LBT faster than that for a PUSCH for carrying data.

Advantageous Effects of Invention

The solutions according to the present disclosure can ensure the fairness between LAA UEs associated with autonomous uplink transmissions and the fairness between LAA UEs associated with autonomous uplink transmissions and scheduled uplink transmissions. Meanwhile, the solutions according to the present disclosure can ensure the proper coexistence of LAA UEs with UEs having other access techniques (e.g., WiFi terminals).

BRIEF DESCRIPTION OF DRAWINGS

The above and other objects and features will be more apparent from the following detailed description of embodiments with reference to the figures, in which:

FIG. 2 is a schematic diagram showing Contention Windows, maximum occupancy time and back-off parameters associated with respective LBT priority classes;

MODE FOR THE INVENTION

In the following, the present disclosure will be described in detail with reference to the drawings and embodiments. It should be noted that the present disclosure is not limited to the embodiments as described below. Moreover, for simplicity, details of well-known techniques which are not directly relevant to the present disclosure will be omitted so as not to obscure the concept of the present disclosure.

In the embodiment of the present disclosure as described below, before a UE transmits a signal on an unlicensed band, instead of waiting for an uplink scheduling signalling, UL-grant, it selects a transmission resource from resources for autonomous uplink transmission for transmitting an uplink signal. The UE needs to perform LBT before transmitting the uplink signal. It can only transmit the signal after the LBT has succeeded.

The resources for autonomous uplink transmission are configured by a base station. For example, time resources for autonomous uplink transmission can be configured via higher layer signaling. Here, the configuration of the time resource may include a period, e.g., a configuration of semi-persistent transmission, or SPS, in the conventional LTE system.

Before transmitting the signal on the unlicensed band, the UE needs to receive activation signaling, which can be physical layer signaling such as SPS activation signaling in the LTE system. The activation signaling indicates frequency-domain resources for autonomous uplink transmission and the beginning of the time resources.

If the UE transmits the uplink signal but the base station fails to demodulate it correctly, the UE will retransmit the uplink signal. This is referred to as retransmission for simplicity. However, this embodiment is not limited to whether the UE identifies a retransmission as a retransmission or a new transmission, or any RV version to be used by the UE. LBT is also required for the retransmission. The retransmission can be transmitted by means of autonomous uplink access.

Figure 1:
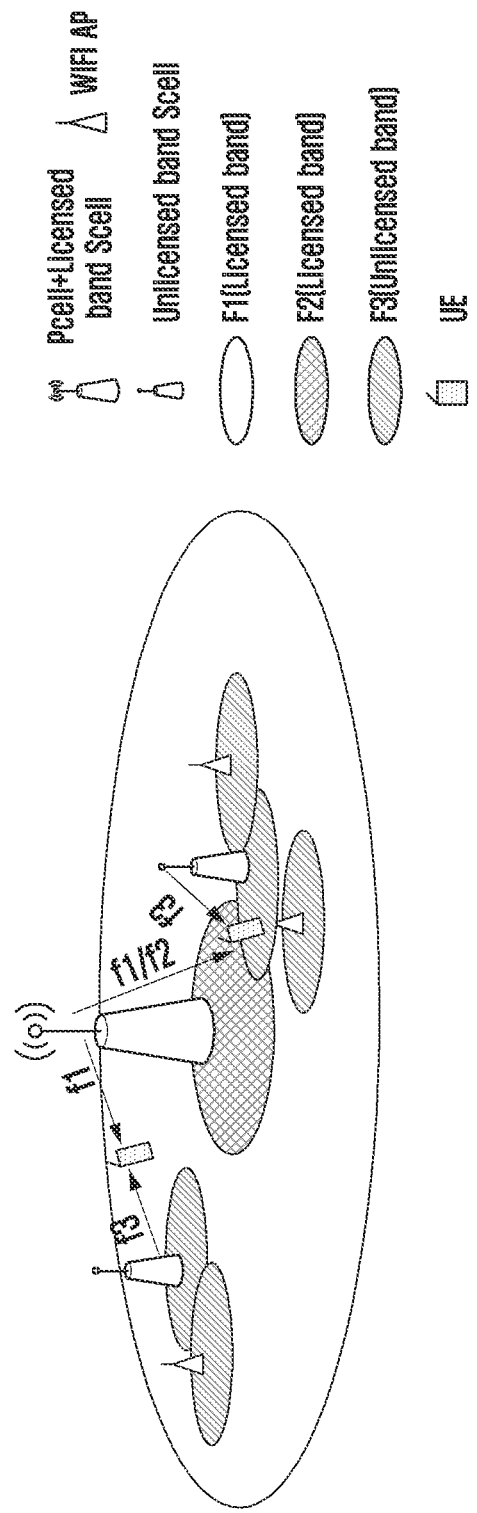
FIG. 1 is a schematic diagram showing a scenario in which licensed bands and unlicensed bands are internetworked by means of carrier aggregation.
Figure 3:
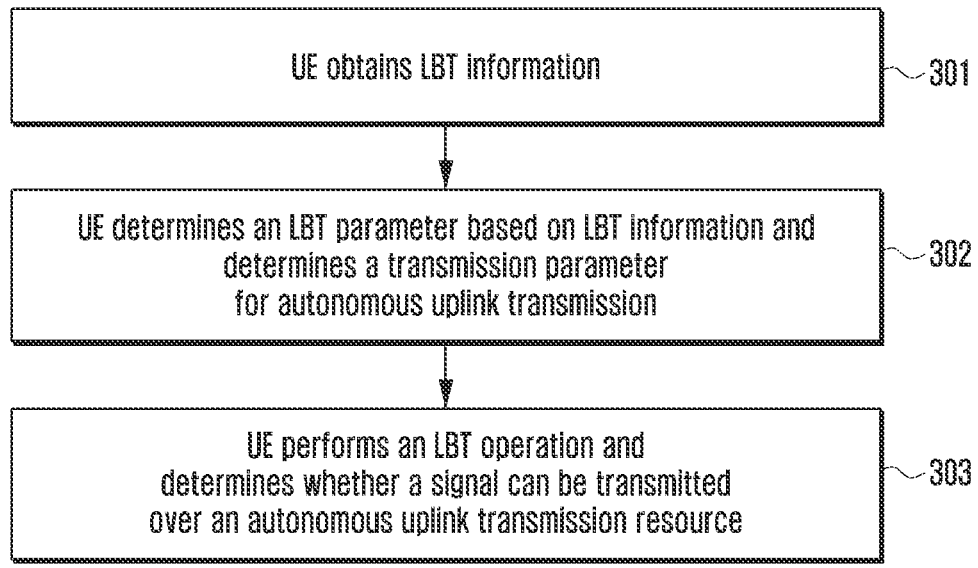
FIG. 3 is a flowchart illustrating a method for autonomous uplink transmission according to an embodiment of the present disclosure.

FIG. 3 is a flowchart illustrating a method for autonomous uplink transmission according to an embodiment of the present disclosure.

At step 301, the UE obtains LBT information.

For example, the UE can obtain the LBT information via Common-Physical Downlink Control Channel (C-PDCCH). Alternatively, the UE can obtain the LBT information via signalling for activation of autonomous uplink transmission. Alternatively, the UE can obtain the LBT information via higher layer signalling. Alternatively, the C-PDCCH and the higher layer signalling can each include a portion of the LBT information and the UE can obtain the LBT information via both the C-PDCCH and the higher layer signalling.

At step 302, the UE determines an LBT parameter based on the LBT information and determines a transmission parameter for autonomous uplink transmission. A number of examples will be given below for explaining in detail how the UE determines the LBT parameter.

Since the autonomous uplink transmission and the scheduled uplink transmission may experience different interferences, for example, the collision probability for the autonomous uplink transmission can be higher than that for the scheduled uplink transmission. Moreover, the autonomous uplink transmission and the scheduled uplink transmission may have different mechanisms for determining whether the transmission has been successfully received by the base station. For example, the autonomous uplink transmission may make such determination based on an explicit ACK/NACK indication. Hence, the schemes for determining the LBT parameter may be different for these two scheduling solutions. For example, the LBT parameter can be determined according to one or more of the following schemes.

(1.1) Energy detection thresholds for the autonomous uplink transmission and the scheduled uplink transmission can be configured separately.

When a LAA UE performs a CCA detection for uplink transmission, it determines whether a channel is idle based on whether a detected channel energy exceeds a threshold $X_{Thresh}$, where $X_{Thresh}$ does not exceed a maximum energy detection threshold $X_{Thresh\_max}$. $X_{Thresh\_max}$ can be configured via higher layer signalling. In this case, the base station can configured $X_{Thresh\_max}$ for the autonomous uplink transmission and the scheduled uplink transmission separately. Alternatively, $X_{Thresh\_max}$ can be determined based on $X'_{Thresh\_max}$, which is obtained based on a maximum transmission power of the UE, and an offset from $X'_{Thresh\_max}$, which is configured via higher layer signalling. In this case, the base station can configured the offsets for the autonomous uplink transmission and the scheduled uplink transmission separately.

(1.2) Contention Window Sizes (CWSs) for the autonomous uplink transmission and the UL-grant-based uplink transmission can be adjusted separately or partially separately. For example, one of the following schemes can be adopted.

If both the autonomous uplink transmission and the UL-grant-based uplink transmission are used for uplink transmissions associated with one single HARQ process, the transmitter and/or the receiver maintain the CWSs separately.

For example, for a data initially transmitted autonomously and retransmitted based on UL-grant, the autonomous transmission and the UL-grant-based transmission maintain their CWSs separately. The ACK/NACK corresponding to the autonomously transmitted PUSCH (which can be an explicitly indicated ACK/NACK, or a conventional ACK/NACK implicitly indicated in NDI of the UL-grant, which are collectively referred to as ACK/NACK) is not used for adjusting the CWS for the UL-grant-based uplink transmission, and vice versa. That is, the subframe in which any one of the two uplink transmissions occurs will not be used as a reference subframe for adjusting the CWS for the other.

The UL-grant-based scheduling can be divided into dynamic UL-grant-based scheduling, such as DCI scrambled with C-RNTI, and UL-grant scheduling for autonomous uplink transmission, such as DCI scrambled with X-RNTI. The activation DCI for autonomous uplink transmission is scrambled with X-RNTI. The X-RNTI can be newly defined or can reuse Semi-Persistent Scheduling (SPS) C-RNTI. Preferably, the CWSs can be maintained for the autonomous uplink transmission and the dynamic UL-grant-based scheduled uplink transmission separately, while the autonomous uplink transmission and the scheduled uplink transmission based on UL-grant for autonomous uplink transmission can maintain one single CWS.

If both the autonomous uplink transmission and the UL-grant-based uplink transmission are used for uplink transmissions associated with one single HARQ process, the ACK/NACK corresponding to the autonomous uplink transmission can be used for adjusting the CWS for the UL-grant-based scheduled uplink transmission, while the ACK/NACK corresponding to the UL-grant-based scheduled uplink transmission is not used for adjusting the CWS for the autonomous uplink transmission. Further, the ACK/NACK corresponding to the autonomous uplink transmission based on the first category of LBT can be used for adjusting the CWS for the UL-grant-based scheduled uplink transmission, while the ACK/NACK corresponding to the UL-grant-based scheduled uplink transmission is not used for adjusting the CWS for the uplink transmission based on autonomous uplink access.

Preferably, the ACK/NACK corresponding to the autonomous uplink transmission based on the first category of LBT and/or the scheduled uplink transmission based on UL-grant for autonomous uplink transmission can be used for adjusting the CWS for the dynamic UL-grant-based scheduled uplink transmission, while the ACK/NACK corresponding to the UL-grant-based scheduled uplink transmission is not used for adjusting the CWS for the uplink transmission based on autonomous uplink access and/or the scheduled uplink transmission based on UL-grant for autonomous uplink transmission.

If both the autonomous uplink transmission and the UL-grant-based uplink transmission are used for uplink transmissions associated with one single HARQ process, the ACK/NACK corresponding to the autonomous uplink transmission is not used for adjusting the CWS for the UL-grant-based scheduled uplink transmission, while the ACK/NACK corresponding to the UL-grant-based scheduled uplink transmission can be used for adjusting the CWS for the autonomous uplink transmission. Further, the ACK/NACK corresponding to the autonomous uplink transmission is not used for adjusting the CWS for the UL-grant-based scheduled uplink transmission, while the ACK/NACK corresponding to the UL-grant-based scheduled uplink transmission based on the first category of LBT can be used for adjusting the CWS for the autonomous uplink transmission.

Preferably, the ACK/NACK corresponding to the autonomous uplink transmission and/or the scheduled uplink transmission based on UL-grant for autonomous uplink transmission is not used for adjusting the CWS for the dynamic UL-grant-based scheduled uplink transmission, while the ACK/NACK corresponding to the UL-grant-based scheduled uplink transmission based on the first category of LBT can be used for adjusting the CWS for the autonomous uplink transmission and/or the scheduled uplink transmission based on UL-grant for autonomous uplink transmission.

If both the autonomous uplink transmission and the UL-grant-based uplink transmission are used for uplink transmissions associated with one single HARQ process, the CWS for the autonomous uplink transmission and/or the scheduled uplink transmission based on UL-grant for autonomous uplink transmission (scrambled with X-RNTI) and the CWS for the dynamic UL-grant-based scheduled uplink transmission (scrambled with Y-RNTI) are independent or partially independent from each other. The activation of the autonomous uplink transmission can be scrambled with X-RNTI (which can be newly defined or reuse the conventional SPS C-RNTI). A retransmission of the autonomous uplink transmission can be scheduled by a UL-granted scrambled with X-RNTI, or triggered by DCI carrying an ACK/NACK indication (and possibly information on the HARQ process). Obviously, the CWS for PUSCH scheduled by the UL-granted scrambled with X-RNTI can be determined based on the value of NDI for the UL grant. For example, NDI=1 indicates retransmission, and the CWS is increased. In another example, if the NDI indicates NACK, the CWS for the retransmitted PUSCH for the autonomous uplink transmission is increased; or if the NDI indicates ACK, the CWS for the retransmitted PUSCH for the autonomous uplink transmission is reset. However, for PUSCH scheduled based on a UL grant scrambled with Y-RNTI (which can be e.g., C-RNTI for dynamic scheduling) in one HARQ process, if the last transmission in the HARQ process is scheduled by a UL grant scrambled with X-RNTI or is an autonomous uplink transmission, the CWS for the LBT of PUSCH scheduled by the UL grant scrambled with Y-RNTI can be adjusted regardless whether the last transmission has succeeded or not. For example, the CWS is not adjusted based on the value of NDI for the UL grant scrambled with Y-RNTI. In one scheme, if the last transmission is scheduled by a UL grant scrambled with X-RNTI or is an autonomous uplink transmission, it is not used as a reference subframe for adjusting the CWS for PUSCH scheduled by the UL grant scrambled with Y-RNTI. Then, a previous PUSCH scheduled by the UL grant scrambled with Y-RNTI can be found and the NDI for the previous UL grant and the NDI for the current UL grant can be compared. If the NDI has been inverted, the CWS is reset; otherwise the CWS is increased. This is advantageous in that, in a practical system, if the previous scheduling is an autonomous uplink transmission or a transmission based on X-RNTI scrambling, no matter what the value indicated by the NDI for the current UL grant scrambled with Y-RNTI is, it is considered that the HARQ process schedules a new transport block. However, it is possible that the last transmission of the HARQ process has not succeeded. Further, the NDI value for the UL grant scrambled with Y-RNTI is typically determined in a different way from the NDI value for the UL grant scrambled with X-RNTI. Hence, it is not possible to determine whether the last transmission has succeeded by comparing the two values.

(1.3) Numbers, K, of times a maximum value, $CW_{max,p}$, of Contention Window (CW) is used consecutively for the autonomous uplink transmission and the scheduled uplink transmission are configured separately.

When a LAA UE performs the first category of LBT for uplink transmission, it determines a maximum value and a minimum value of CW, denoted as $CW_{max,p}$ and $CW_{min,p}$, respectively, based on an LBT priority class. If the length of CW, $CW_p=CW_{max,p}$ for K consecutive CWs, the length of CW is reset as $CW_p=C_{min,p}$. The base station configures K values for the autonomous uplink transmission and the scheduled uplink transmission separately, as K1 and K2.

For example, the UE has two HARQ processes: HARQ process 1 being scheduled based on UL-grant and HARQ process 2 being autonomous uplink transmission. Then, the CWSs for these two HARQ processes are maintained separately and K1 and K2 are configured separately.

(1.4) For a CWS for an uplink transmission, the value of the CWS is determined based on ACK/NACK associated with an uplink transmission of a reference subframe.

Preferably, the ACK/NACK is indicated explicitly via physical layer signalling. For example, a UE-group based DCI can indicate ACKs/NACKs for a number of UEs.

The uplink transmission can be an autonomous uplink transmission or a scheduled uplink transmission based on UL-grant for autonomous uplink transmission. Alternatively, the uplink transmission can be an autonomous uplink transmission, a scheduled uplink transmission based on UL-grant for autonomous uplink transmission, or a dynamic UL-grant-based scheduled uplink transmission.

Preferably, if at least one of the uplink transmissions of the reference subframe is ACK, CWSs for all LBT priorities of the uplink transmissions are reset. Otherwise, if e.g., all the uplink transmissions of the reference subframe are NACKs, or if the UE does not receive any ACK/NACK indication (which can be DCI for ACK/NACK, or UL grant for scheduling a retransmission or new transmission of an uplink transmission of the reference subframe), the CWSs for all LBT priorities are increased. Here, the reference subframe is the first subframe in the most recent uplink transmission burst based on the first category of LBT at least 4 subframes before the subframe $n_0$ in which the ACK/NACK indication associated with the most recent transmission of the uplink transmission for which the CWS is to be adjusted is located (the end subframe of the uplink burst is no later than the subframe $n_0$-4).

Preferably, the ACK/NACK indication for the reference subframe occurs earlier than the uplink subframe for which the CWS is to be adjusted based on the reference subframe, with a time difference smaller than X subframes from the latter.

Figure 6A:
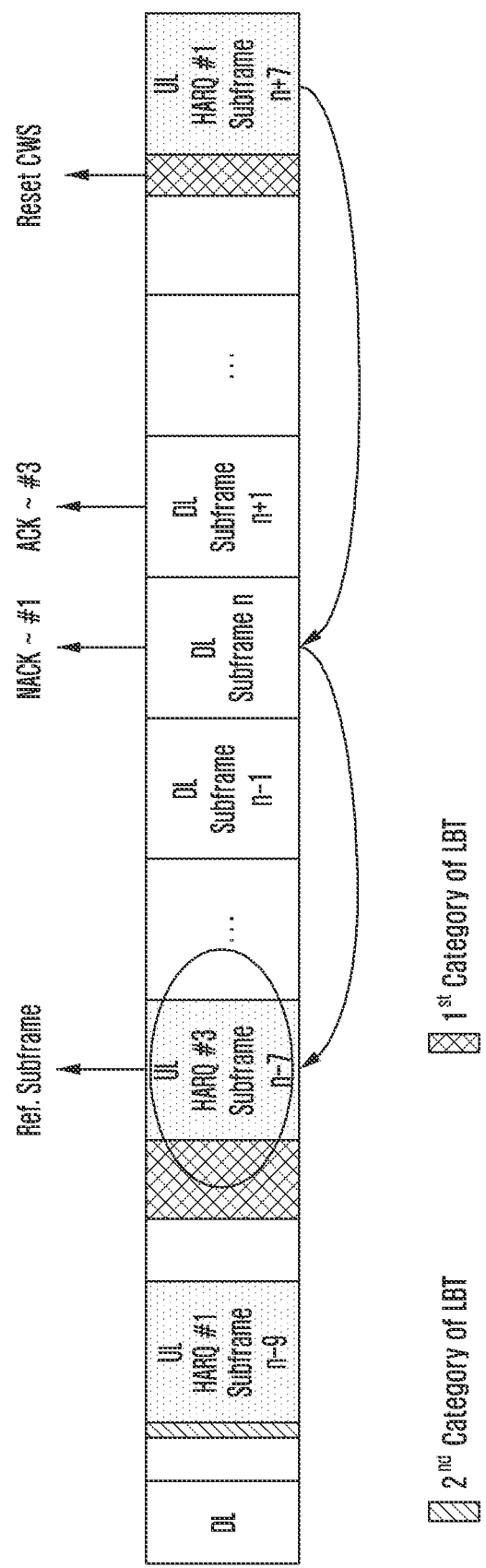
FIGS. 6A and 6B are two schematic diagrams each showing adjustment of a size of a contending window according to an embodiment of the present disclosure.

As shown in FIG. 6A, it is assumed that Uplink HARQ Process #1 and Uplink HARQ Process #3 are transmitted in subframe n−9 and subframe n−7, using the second category of LBT and the first category of LBT, respectively. In subframe n and subframe n+1, the UE receives ACKs associated with Uplink HARQ Process #1 and Uplink HARQ Process #3, respectively. The UE attempts to perform a retransmission at the position corresponding to Uplink HARQ Process #1 and a new transmission at the position corresponding to Uplink HARQ Process #3. Then, for the CWS for the uplink transmission of Uplink HARQ Process #1, the reference subframe can be determined based on the first uplink subframe transmitted based on the first category of LBT before subframe n in which the ACK/NACK indication for the Uplink HARQ Process #1 is located. The reference subframe is subframe n−7 in which Uplink HARQ Process #3 is transmitted successfully and the base station transmits the ACK in subframe n+1. Hence, the CWS for the uplink transmission in subframe n+7 is reset.

Figure 6B:
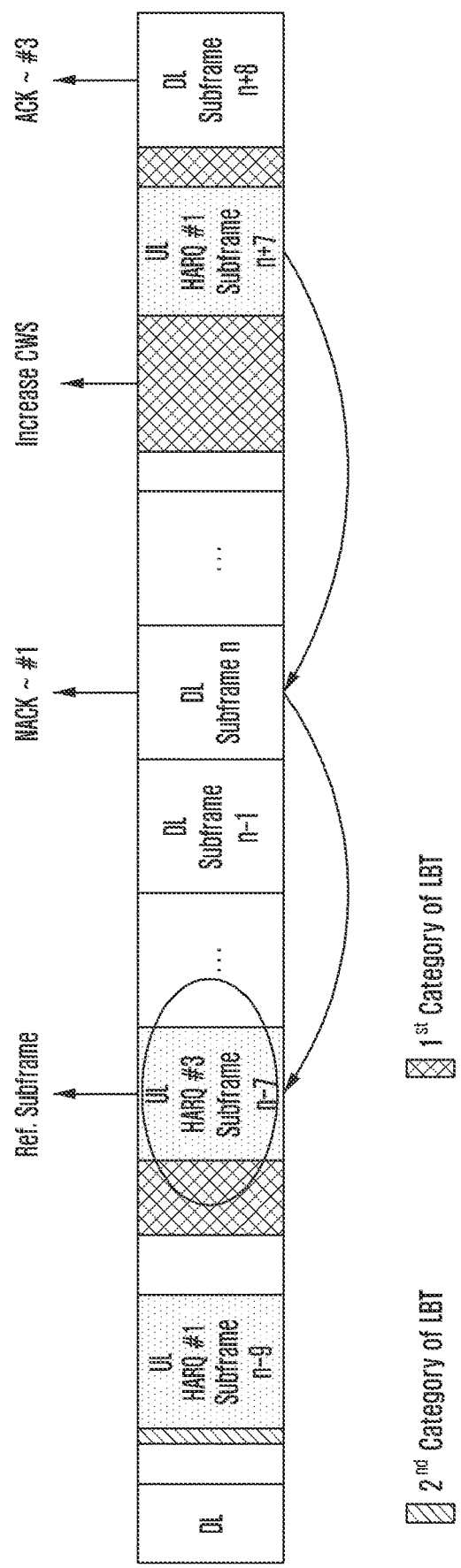

As shown in FIG. 6B, it is assumed that Uplink HARQ Process #1 and Uplink HARQ Process #3 are transmitted in subframe n−9 and subframe n−7, using the second category of LBT and the first category of LBT, respectively. In subframe n, the UE receives a NACK associated with Uplink HARQ Process #1. The UE attempts to perform a retransmission at the position corresponding to Uplink HARQ Process #1. Then, for the CWS for the uplink transmission of Uplink HARQ Process #1, the reference subframe can be determined based on the first uplink subframe transmitted based on the first category of LBT before subframe n in which the ACK/NACK indication for the Uplink HARQ Process #1 is located. The reference subframe is subframe n−7. Since the UE has not received any ACK/NACK indication for Uplink HARQ Process #3 transmitted in subframe n−7, the UE increases the CWS for the uplink transmission in subframe n+7. It can be seen that, while the uplink transmission of Uplink HARQ Process #3 has been received by the base station successfully, since the base station has not fed back ACK timely but feeds back ACK in DL subframe n+8, the UE has to increase the CWS.

(1.5) The reference subframe for adjusting the CWS for the autonomous uplink transmission is the first uplink subframe in the first uplink burst occupying a channel based on the first category of LBT at least X subframes before the uplink subframe no in which the UE is to transmit the autonomous uplink transmission (the end subframe of the uplink burst is no later than the subframe $n_0$–X).

Unlike a UL-grant-based scheduled uplink transmission or an uplink transmission triggered based on DCI of ACK/NACK feedback, the autonomous uplink transmission here means that the UL-grant scheduling or the DCI of ACK/NACK feedback has not been received for a time period. For example, when the base station activates an SPS transmission, the UE may have no traffic to transmit and thus may not transmit uplink data. After a while, a new data packet arrives and the UE can perform autonomous uplink transmission on the activated SPS resource. Alternatively, after the UE has successfully transmitted a set of data packets and has no data to transmit in its buffer, it can stop the transmission. After a while, a new data packet arrives and the UE can perform autonomous uplink transmission on the activated SPS resource. Alternatively, in a timer-based new transmission or retransmission, if the UE does not receive any downlink control signalling for triggering the UE to perform a new transmission or a retransmission within a predefined time window, the UE can perform autonomous uplink transmission on an SPS resource after the end of the time window.

For the autonomous uplink transmission as described above, the UE needs to determine the value of CWS. Then, the reference subframe can be the first uplink subframe in the most recent uplink burst occupying a channel based on the first category of LBT at least X subframes before the uplink subframe no in which the UE is to transmit the autonomous uplink transmission (the end subframe of the uplink burst is no later than the subframe $n_0$–X). Preferably, X can be a predefined value, e.g., X=4.

(1.6) If the UE attempts but fails to perform uplink transmission in at least one uplink subframe within the uplink burst in which the reference subframe is located, the CWS remains unchanged.

The first uplink burst may include one or more consecutive uplink subframes.

The first uplink burst can only be a dynamic UL-grant-based scheduled uplink burst, or can only be a dynamic UL-grant-based scheduled uplink burst or a scheduled uplink burst based on UL-grant for autonomous uplink transmission, or can be any uplink burst, including an uplink burst for autonomous uplink transmission.

(1.7) If the CWSs for at least two uplink subframes based on autonomous uplink transmission are to be adjusted based on one single reference subframe, the CWS of the first uplink subframe can be adjusted based on whether the reference subframe has been correctly received by the base station, while the value(s) of the CWS(s) for the subsequent uplink subframe(s) can be the same as the value for the first uplink subframe.

Figure 7:
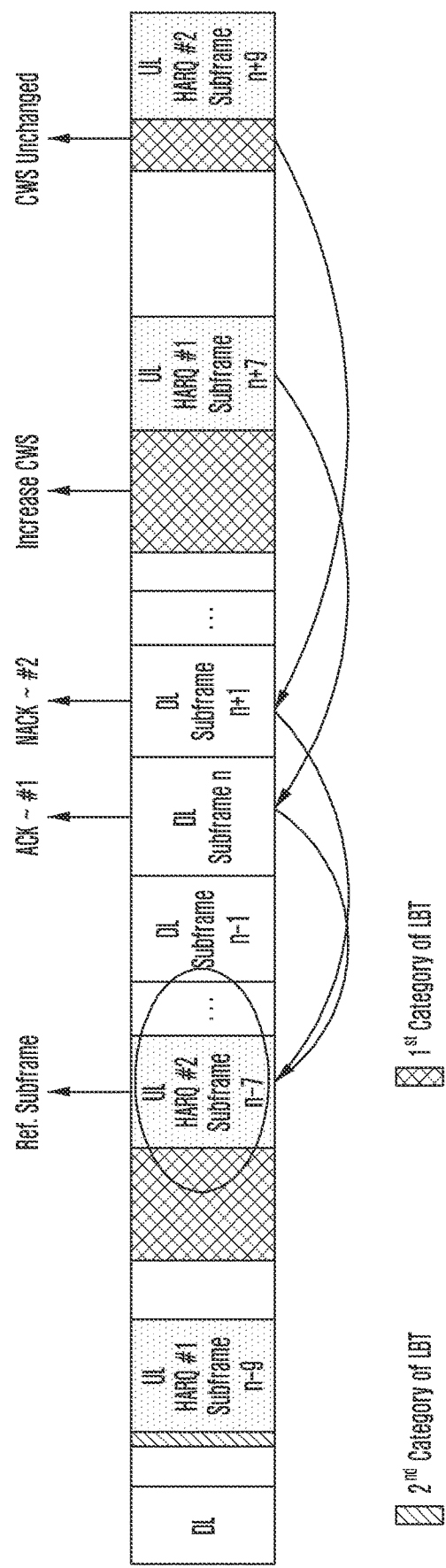
FIG. 7 is a schematic diagram showing adjustment of a size of a contending window according to an embodiment of the present disclosure.

As shown in FIG. 7, it is assumed that the autonomous uplink transmission has a period of 2 ms and there are two HARQ processes. It is also assumed that Uplink HARQ Process #1 and Uplink HARQ Process #2 are transmitted in subframe n−9 and subframe n−7, using the second category of LBT and the first category of LBT, respectively. In subframe n and subframe n+1, the UE receives an ACK associated with Uplink HARQ Process #1 and a NACK associated with Uplink HARQ Process #2, respectively. The UE attempts to perform a new transmission at the position corresponding to Uplink HARQ Process #1 and a retransmission at the position corresponding to Uplink HARQ Process #2. Then, for the CWS for the uplink transmission of Uplink HARQ Process #1, the reference subframe can be determined based on the first uplink subframe transmitted based on the first category of LBT before subframe n in which the ACK/NACK indication for the Uplink HARQ Process #1 is located. The reference subframe is subframe n−7. For the CWS for the uplink transmission of Uplink HARQ Process #2, the reference subframe can be determined based on the first uplink subframe transmitted based on the first category of LBT before subframe n+1 in which the ACK/NACK indication for the Uplink HARQ Process #2 is located. The reference subframe is also subframe n−7. Since the NACK in subframe n+1 corresponding to the uplink transmission in subframe n−7 is received, the CWS for the uplink transmission in subframe n+7 is increased and the CWS for subframe n+9 is the same as the CWS for subframe n+7.

(1.8) The LBT priority for the autonomous uplink transmission or the scheduled uplink transmission based on UL-grant for autonomous uplink transmission can be determined according to one or more of the following schemes.

When there are a number of available HARQ processes, the LBT priorities of all processes can be indicated by one activation DCI. The LBT priorities are determined based on the lowest LBT priority (i.e., the highest index number of LBT priority class) among all the HARQ processes.

When there are a number of available HARQ processes, the LBT priorities of all processes can be indicated by one activation DCI. The indicated LBT priorities are determined based on the highest LBT priority (i.e., the lowest index number of LBT priority class) among all the HARQ processes. The LBT priorities used in the respective HARQ processes are not necessarily limited to, but cannot be higher than, the indicated LBT priorities.

For a retransmission or a new transmission of the scheduled uplink transmission based on UL-grant for autonomous uplink transmission, a new LBT priority can be indicated, which will override the LBT priority indicated in the activation DCI.

In the DCI indicating ACK/NACK, not only a HARQ process index and an ACK/NACK for the process, but also the new LBT priority for the HARQ process, can be indicated, which will override the LBT priority indicated in the activation DCI.

For a new transmission or retransmission of the dynamic UL-grant-based scheduled uplink transmission, a new LBT priority can be indicated, which will override the LBT priority indicated in the activation DCI.

Preferably, the autonomous uplink transmission uses only the first category of LBT, but not the second category of LBT. When the UE receives MCOT indication information and the uplink subframe in which the UE is to perform the autonomous uplink transmission is within the set of uplink subframes indicated in the MCOT indication information, the UE only uses the first category of LBT. The set of uplink subframes indicated in the MCOT indication information can be determined based on a bit field of "LAA Uplink Configuration" in C-PDCCH according to Rel-14 LAA, i.e., on "UL offset" and "UL duration".

Preferably, the uplink transmission based on autonomous uplink access can use the first or second category of LBT. When the UE receives the MCOT indication information and the uplink subframe in which the UE is to perform the autonomous uplink transmission is within the set of uplink subframes indicated in the MCOT indication information, the UE can use the second category of LBT.

Preferably, when the autonomous uplink transmission of the UE uses the second category of LBT, after the LBT has succeeded, if the UE transmits k subframes continuously without any gap between them, then the k subframes must be located in the set of uplink subframes indicated in the MCOT indication information. If some of the k subframes are located outside the set of uplink subframes indicated in the MCOT indication information, only the first category of LBT can be used, or the first category of LBT needs to be used for the subframes outside the set of uplink subframes indicated in the MCOT indication information.

Preferably, when the autonomous uplink transmission of the UE uses the first category of LBT, after the LBT has succeeded, the UE transmits k subframes continuously. These k subframes are continuous at the subframe level, but have gaps between them. For example, the UE transmits 4 subframes continuously, with the first and/or last symbol of each subframe left blank. Then the second category of LBT can be used for these subframes within the MCOT determined by the UE based on the first category of LBT.

In another embodiment, when the UE is to perform the autonomous uplink transmission, it can determine a transmission parameter based on the category of LBT and/or the LBT priority class according to one or more of the following schemes. The transmission parameter can be a transmission parameter for a new transmission or a retransmission. For example, the transmission parameter can be a time parameter or a frequency-domain parameter of the autonomous uplink transmission resource, an indication indicating whether the uplink transmission can be performed or a traffic type of the uplink transmission.

When the transmission parameter is an indication indicating whether the uplink transmission can be performed, the following two schemes can be used to determine whether the uplink transmission can be performed.

(2.1) It is determined whether the signal can be transmitted over an autonomous transmission resource based on a category of LBT.

It is assumed whether the UE can transmit the signal over the autonomous transmission resource depends on comparison between a random number generated by the UE and a defined threshold. If the random number exceeds the defined threshold, the transmission can be performed; otherwise the transmission cannot be performed (of course the transmission cannot be performed if the LBT fails). Then, a threshold, Thr1, is configured for the first category of LBT and a threshold, Thr2, is configured for the second category of LBT, where Thr1<Thr2, such that a probability that the UE generates a random number larger than Thr1 is higher than a probability that the UE generates a random number larger than Thr2. Hence, within one subframe, the number of UEs having the first category of LBT and attempting to transmit the uplink signal by means of autonomous uplink access is larger than the number of UEs having the second category of LBT and attempting to transmit the uplink signal by means of autonomous uplink access. Alternatively, the same threshold can be used for the first category of LBT and the second category of LBT, but the categories of LBT can be used as weighting factors when the UE generates the random number, such that the UE having the first category of LBT can have a higher probability of generating a larger random number. This method also applies to determining the resource to be used for the autonomous uplink transmission in other schemes.

This method can reduce the number of UEs having the second category of LBT that may select to perform the autonomous uplink transmission over the same resource, thereby reducing the probability of collision between UEs having the second category of LBT. The individual UEs having the second category of LBT that select the same subframe for transmitting uplink signals by means of autonomous uplink transmission perform 25 us LBT at the same position and thus cannot discover each other, which leads to a high probability of collision between the UEs. The individual UEs having the first category of LBT that select the same subframe for transmitting uplink signals by means of autonomous uplink transmission can use different CWSs to reduce such collision between the UEs.

(2.2) It is determined whether the signal can be transmitted over an autonomous transmission resource based on an LBT priority class.

It is assumed whether the UE can transmit the signal over the autonomous transmission resource depends on comparison between a random number generated by the UE and a defined threshold. If the random number exceeds the defined threshold, the transmission can be performed; otherwise the transmission cannot be performed (of course the transmission cannot be performed if the LBT fails). Then, thresholds can be configured for different LBT priority classes, respectively. For example, thresholds can be configured for the four LBT priority classes in Table 1, respectively. Alternatively, k (k<4) thresholds can be configured, which correspond to one or more LBT priority classes. The threshold for a higher LBT priority can be set to be lower, such that the traffic having the higher LBT priority can be transmitted at a higher probability, thereby ensuring the traffic having a higher QCI to be transmitted timely with a probability of collision. Alternatively, only one threshold can be configured, but the categories of LBT can be used as weighting factors when the UE generates the random number, such that the UE having a higher LBT priority can have a higher probability of generating a larger random number.

This method is particularly suitable for the UE using the second category of LBT, since, for the second category of LBT, a 25 us LBT is performed at the same position regardless of the LBT priority class. Hence, the traffic having a high QCI and the traffic having a low QCI may collide. With this method, a lower threshold can be configured for the traffic having the higher QCI (i.e., having a smaller value of LBT priority class) and a higher threshold can be configured for the traffic having the lower QCI, such that the impact of the traffic having the lower QCI on the traffic having the higher QCI can be reduced.

Similarly, the scheme (2.1) or (2.2) can be used for determining the time parameter for the autonomous uplink transmission resource.

When the transmission parameter is a time or frequency-domain parameter for the autonomous uplink transmission resource, it can be determined by the UE based on configuration information from the base station. Here, the configuration information can contain information on the LBT priority class corresponding to the autonomous uplink transmission resource. The UE can determine the autonomous uplink transmission resource based on the LBT priority class of the autonomous uplink transmission to be transmitted.

When the transmission parameter is a time length or a traffic type of the autonomous uplink transmission, it can be determined according to one of the following schemes.

(3.1) If the autonomous uplink transmission of the UE uses the second category of LBT, the UE can determine the LBT priority class used by the base station for downlink transmission within the current MCOT based on indication information from the base station. The UE can determine an uplink transmission parameter (e.g., a subframe length that can be transmitted) of the UE based on the LBT priority class. The QCI of the traffic actually transmitted by the UE can be decided by the UE. In determining the subframe length, the UE shall guarantee that the subframe length would not exceed the minimum number of subframes required for transmitting any traffic having the same LBT priority class or having a lower LBT priority class index than the LBT priority class (i.e., having a higher LBT priority). Alternatively, based on the LBT priority class, the UE can determine the uplink transmission parameter, including the subframe length that can be transmitted and the QCI of the traffic actually transmitted by the UE. That is, the LBT priority class index corresponding to the QCI of the traffic actually transmitted by the UE shall not exceed the index of the LBT priority class. The indication information from the base station can be carried in C-PDCCH. In other words, the LBT priority class used for downlink transmission within the current MCOT can be indicated in the C-PDCCH.

(3.2) If the autonomous uplink transmission of the UE uses the second category of LBT, the UE can determine the LBT priority class used by the base station for downlink transmission within the current MCOT based on indication information from the base station. The UE can determine the subframe length that can be transmitted based on the LBT priority class, or further determine the LBT priority class available for the autonomous uplink transmission having the second category of LBT. In determining the subframe length, the UE shall guarantee that the subframe length would not exceed the minimum number of subframes required for transmitting any traffic having the same LBT priority class or having a lower LBT priority class index than the LBT priority class (i.e., having a higher LBT priority).

(3.3) When the UE receives MCOT_1 indication information and information indicating an end symbol of the downlink transmission, and when the uplink transmission in which the UE is to perform the autonomous uplink transmission is within MCOT_1 and the uplink transmission in which the UE is to perform the autonomous uplink transmission is immediately adjacent to the indicated end subframe of the downlink transmission or is the same as the indicated end subframe of the downlink transmission, if the UE can complete the second category of LBT after the end symbol of the downlink transmission, the UE can start the autonomous uplink transmission from 25 us after the end symbol of the downlink transmission; otherwise the UE can only perform the first category of LBT. If the transmission is performed in a number of consecutive subframes, these consecution subframes shall be within MCOT_1.

For example, the base station selects, from a plurality of downlink carriers, a downlink carrier X for Cat-4 LBT and other carriers Y and Z for 25 us LBT (i.e., Type-B LBT for multi-carrier as specified in TS 36.213 15.1.5.2). Assuming that the LBT for the downlink carrier X and the LBT for the downlink carrier Y succeed at subframe 0, the base station can share MCOT with UEs served by the base station on the carriers X and Y. Assuming MCOT=4 ms, if there is an uplink subframe in subframes 0-3, the uplink subframe is within the MCOT. For the carrier Y, the shared MCOT is referred to as MCOT_1 (MCOT_1 and MCOT have the same length). All uplink transmission within the MCOT on the carrier X can use the second category of LBT. On the carrier Y, the uplink transmission can use the second category of LBT only when the gap between the uplink transmission and the downlink transmission within the MCOT is smaller than or equal to 25 us. Otherwise, the uplink transmission has to use the first category of LBT even if it is within the MCOT. It is assumed that the base station performs the downlink transmission from subframe 0 to the third symbol of subframe 2. The MCOT_1 has a length of 4. It is further assumed that subframe 2 is a subframe for the autonomous uplink transmission resource. Then, the UE can start the second category of LBT (i.e., 25 us CCA) from the fourth symbol based on DL timing. If the channel is idle, the UE can start transmitting an uplink signal by means of autonomous uplink access 25 us after the fourth symbol of subframe 2, i.e., starting at (25+TA) us of the fourth symbol of subframe 2 based on UL timing, where TA is an uplink timing advance.

At step 303, the UE performs an LBT operation based on the determined LBT parameter and determines whether a signal can be transmitted over an autonomous uplink transmission resource based on the transmission parameter. If the LBT succeeds, the UE can transmit the signal over the autonomous uplink transmission resource; otherwise the UE can abort the transmission.

Preferably, the autonomous uplink transmission resource is configured by the base station, e.g., via higher layer signaling and/or physical layer trigger signaling. The autonomous uplink transmission resource may include: a time-frequency resource for uplink transmission (e.g., period, time offset, PRB resource or Band-Width Part (BWP), Modulation and Coding Scheme (MCS), reference symbol parameter (e.g., reference symbol sequence, Orthogonal Code Word (OCC) or cyclic shift). Further the autonomous uplink transmission resource can further include other necessary information, e.g., Redundancy Version (RV) information, a number (K) of repetitive transmissions. Reference can be made to the configurations in steps 401 and 402.

Preferably, after the autonomous uplink transmission in the step 303, the UE receives a HARQ-ACK feedback associated with the autonomous uplink transmission on a particular type of downlink carrier.

Preferably, the particular type of downlink carrier is Pcell or pSCell.

Preferably, the particular type of downlink carrier is a licensed band carrier configured by the base station. For example, the licensed band carrier can be a carrier on which indication information for triggering the autonomous uplink transmission or indicating the autonomous uplink transmission failure as transmitted at step 402. For example, the base station transmits an indication for triggering the autonomous uplink transmission on a licensed band carrier $CC_2$, triggering the UE to perform the autonomous uplink transmission on an unlicensed band carrier $CC_3$. In this case, after performing the autonomous uplink transmission on $CC_3$, the UE can receive a HARQ-ACK feedback on $CC_2$.

Preferably, the particular type of downlink carrier is a carrier for activation of the autonomous uplink transmission.

Preferably, the time at which the HARQ-ACK feedback is to be received is determined based on the time at which the autonomous uplink transmission is performed and a predefined time offset.

Preferably, the HARQ-ACK feedback is carried by PHICH or PDCCH. The PDCCH may contain no scheduling information, but the HARQ-ACK information only. The PDCCH can be common to a number of UEs and the HARQ-ACKs for different UEs occupy different bits in the PDCCH. Preferably, the PDCCH contains information on HARQ processes associated with the respective UEs.

Preferably, the UE determines to retransmit the autonomous uplink transmission or transmit new data based on the received HARQ-ACK feedback.

Preferably, the time at which the UE retransmits the autonomous uplink transmission or transmits the new data is determined based on the time at which the HARQ-ACK feedback is received and a predefined time offset.

Preferably, the time at which the UE retransmits the autonomous uplink transmission or transmits the new data is determined from a time window having a start obtained based on the time at which the HARQ-ACK feedback is received and a predefined time offset. An end of the time window is determined based on a predefined time window length. The UE performs LBT within the time window, attempting to retransmit the autonomous uplink transmission or transmit the new data on the autonomous uplink transmission resource. Further, when there are a number of HARQ processes, the UE attempts to retransmit the autonomous uplink transmission or transmit the new data on the autonomous uplink transmission resources associated with the respective HARQ processes.

Preferably, for one HARQ process, if the UE receives the HARQ-ACK feedback and a UL grant, the UE determines the transmission of PUSCH based on the indication in the UL grant.

Preferably, information on a HARQ process, e.g., HARQ ID, is included in PUSCH transmitted by the UE by means of autonomous uplink transmission. It can be explicitly indicated with one or more bits, or implicitly by DMRS.

Figure 4:
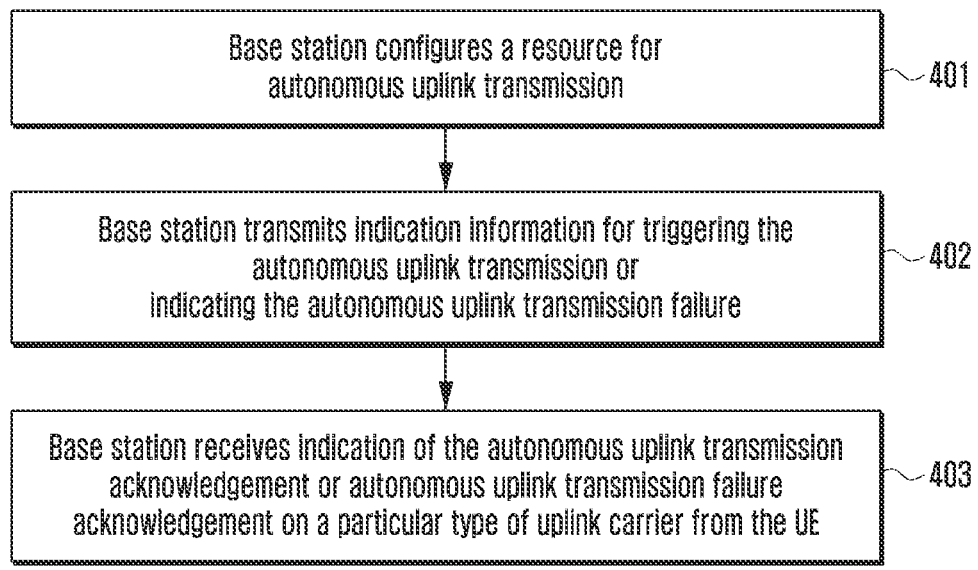
FIG. 4 is a flowchart illustrating a process for configuring autonomous uplink transmission according to an embodiment of the present disclosure.

FIG. 4 is a flowchart illustrating a process for configuring autonomous uplink transmission according to an embodiment of the present disclosure.

At step 401, the base station configures a resource for autonomous uplink transmission.

The resource for autonomous uplink transmission includes at least a time resource. Here, the configuration of the time resource includes a period. The configuration of the time resource can be in a form of bitmap.

Preferably, the resource for autonomous uplink transmission can further include a frequency resource, e.g., information on an uplink carrier.

Preferably, the resource for autonomous uplink transmission can further include information on a HARQ process associated with the resource for autonomous uplink transmission, e.g., a HARQ process ID.

Preferably, the resource for autonomous uplink transmission can further include LBT-related information, e.g., an LBT priority that can be used for the autonomous uplink transmission, or LBT type information.

The resource for autonomous uplink transmission is configured via RRC signaling, MAC Control Element (CE), physical layer control information, or combination thereof. The physical layer control information can be included in indication information for triggering the autonomous uplink transmission as transmitted from the base station in the step 402. The physical layer control information can be C-PDCCH.

At step 402, the base station transmits indication information for triggering the autonomous uplink transmission or indicating the autonomous uplink transmission failure.

Preferably, the indication information is carried by physical layer signaling, e.g., SPS activation signaling or SPS deactivation signaling in the LTE system.

Preferably, the indication information can further include LBT-related information, e.g., an LBT priority that can be used for the autonomous uplink transmission, or LBT type information.

Preferably, the indication information can further include information on a frequency-domain resource for the autonomous uplink transmission, e.g., information on Physical Resource Blocks (PRBs) to be occupied, or information on an index of a corresponding uplink carrier.

Preferably, the indication information can further include information on a frequency-domain resource for autonomous uplink transmission acknowledgement or autonomous uplink transmission failure acknowledgement information in step 402, e.g., information on Physical Resource Blocks (PRBs) to be occupied by the information, or information on an index of a corresponding uplink carrier.

Preferably, the information on the PRBs for the frequency-domain resource for the autonomous uplink transmission is the same as the information on the PRBs for the autonomous uplink transmission acknowledgement or autonomous uplink transmission failure acknowledgement information.

Preferably, the indication information includes information indicating an index of an uplink carrier corresponding to the autonomous uplink transmission failure, i.e., indicating the uplink carrier on which the autonomous uplink transmission has failed.

Preferably, the indication information includes an indication of a start of a time resource available for the autonomous uplink transmission.

Preferably, the base station can only transmit the indication information in a licensed band.

Preferably, the base station can only transmit the indication information on a primary carrier (Pcell) or a primary secondary carrier (Pscell).

For example, when the base station transmits the indication signaling for transmitting the autonomous uplink transmission on an unlicensed band carrier $CC_2$, it can only transmit the indication signaling on Pcell $CC_1$. The indication signaling includes carrier indication information, e.g., a 3-bit CIF, for triggering the autonomous uplink transmission on $CC_2$.

Preferably, when the base station transmits the indication of the autonomous uplink transmission or autonomous uplink transmission failure on an unlicensed band carrier and the downlink transmission burst including the indication does not contain any other downlink transmission, the base station can use a different category of LBT from PDSCH carrying regular data or PDCCH scheduling regular data. For example, a 25 us LBT can be used. Alternatively, Cat 4 LBT having the highest priority can be used. For example, the CWS can be set to [3, 7].

At step 403, the base station receives the indication of the autonomous uplink transmission acknowledgement or autonomous uplink transmission failure acknowledgement on a particular type of uplink carrier from the UE.

Preferably, the particular type of uplink carrier is an uplink carrier on a licensed band.

Preferably, the particular type of uplink carrier is Pcell or PS Cell.

By transmitting the indication of the autonomous uplink transmission acknowledgement or autonomous uplink transmission failure acknowledgement on the licensed band from the UE, it is advantageous that the timely transmission of the indication can be ensured. If the indication of the autonomous uplink transmission acknowledgement or autonomous uplink transmission failure acknowledgement is transmitted on an unlicensed band, the UE may not be able to succeed in LBT at or before a specific time due to a busy channel and thus may not be able to transmit the indication of the autonomous uplink transmission acknowledgement or autonomous uplink transmission failure acknowledgement. In this case, the base station cannot determine whether the UE has not received the indication information for triggering the autonomous uplink transmission or indicating the autonomous uplink transmission failure, or has not occupied the channel successfully.

Preferably, the particular type of uplink carrier is an uplink carrier corresponding to the downlink carrier on which the indication information for triggering the autonomous uplink transmission or indicating the autonomous uplink transmission failure is transmitted in the step 402. Their correspondence can be indicated via higher layer signaling. Alternatively, the carrier on which the UE transmits the indication of the autonomous uplink transmission acknowledgement or autonomous uplink transmission failure acknowledgement is the same as the carrier on which the UE receives the indication information for triggering the autonomous uplink transmission or indicating the autonomous uplink transmission failure.

Preferably, the indication information of the autonomous uplink transmission acknowledgement or autonomous uplink transmission failure acknowledgement includes carrier index information indicating which uplink carrier the acknowledgement indication information is for. In the above example, the acknowledgement indication information contains information on the uplink carrier $CC_2$.

Preferably, a time-frequency resource occupied for transmitting the indication information of the autonomous uplink transmission acknowledgement or autonomous uplink transmission failure acknowledgement on the particular type of uplink carrier is determined based on the indication information for triggering the autonomous uplink transmission or indicating the autonomous uplink transmission failure in the step 402. For example, the time-frequency resource occupied for transmitting the autonomous uplink transmission acknowledgement information can be the same as the time-frequency resource for the autonomous uplink transmission, but may be on different carriers. As another example, the frequency-domain resource occupied for transmitting the autonomous uplink transmission acknowledgement information can be configured by higher layer semi-statically, while the time resource can be determined by the indication information for autonomous uplink transmission. For example, the time resource can be the X-th subframe after the subframe on which the indication information for autonomous uplink transmission is received.

Preferably, the particular type of uplink carrier is the carrier on which the autonomous uplink transmission occurs, i.e., it can be an unlicensed band carrier. In one implementation, the only transmission subframe on which the indication information of the autonomous uplink transmission acknowledgement or autonomous uplink transmission failure acknowledgement is transmitted is determined based on the time at which the indication information for triggering the autonomous uplink transmission or indicating the autonomous uplink transmission failure is transmitted in the step 402. The transmission subframe is a subframe for the autonomous uplink transmission. For example, the first subframe available for the autonomous uplink transmission is determined based on the indication information for triggering the autonomous uplink transmission. In another implementation, in order to increase the probability of transmission of the acknowledgement indication information, the UE performs CCA detection within a time window, attempting to transmit the indication of the autonomous uplink transmission acknowledgement or autonomous uplink transmission failure acknowledgement in an uplink subframe. If the UE fails to transmit the indication of the autonomous uplink transmission acknowledgement or autonomous uplink transmission failure acknowledgement within the time window, the UE will abort transmission of the indication. Preferably, the time window is the subframe on which the indication information for triggering the autonomous uplink transmission or indicating the autonomous uplink transmission failure is transmitted in the step 402, or $X_r$ consecutive subframes starting from a reference point that is the first subframe available for the autonomous uplink transmission determined based on the indication information for triggering the autonomous uplink transmission in the step 402. Within this time window, the UE needs to determine the uplink subframe available for the autonomous uplink transmission based on the uplink/downlink information indicated by the base station.

Preferably, when transmitting an indication of the autonomous uplink transmission acknowledgement or autonomous uplink transmission failure acknowledgement on the unlicensed band carrier, the UE can use a different category of LBT from PUSCH carrying regular data. For example, a 25 us LBT can be used. Alternatively, Cat 4 LBT having the highest priority can be used. For example, the CWS can be set to [3, 7].

Figure 5:
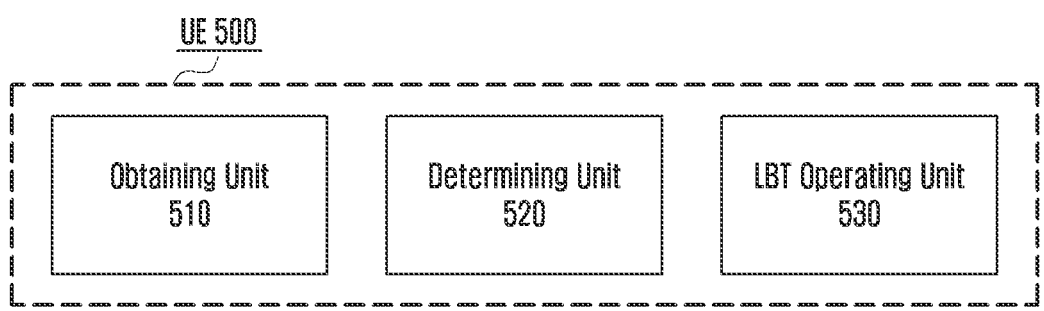
FIG. 5 is a block diagram of a User Equipment (UE) according to an embodiment of the present disclosure.

FIG. 5 is a block diagram of a User Equipment (UE) according to an embodiment of the present disclosure. As shown in FIG. 5, the UE 500 includes an obtaining unit 510, a determining unit 520 and an LBT operating unit 530.

The obtaining unit 510 is configured to obtain Listen Before Talk (LBT) information. For example, the obtaining unit 510 can obtain the LBT information via C-PDCCH. Alternatively, the obtaining unit 510 can obtain the LBT information via higher layer signalling. Alternatively, the obtaining unit 510 can obtain the LBT information via both C-DPCCH and higher layer signalling.

The determining unit 520 is configured to determine an LBT parameter based on the LBT information and determine a transmission parameter for autonomous uplink transmission. In particular, the determining unit 520 can perform the above operations described in connection with the step 302 in FIG. 3 and the details thereof will be omitted here.

The LBT operating unit 530 is configured to perform an LBT operation based on the determined LBT parameter and determine whether a signal can be transmitted over an autonomous uplink transmission resource based on the transmission parameter. In particular, the LBT operating unit 530 can perform the above operations described in connection with the step 303 in FIG. 3 and the details thereof will be omitted here.

The programs for realizing the functions of the embodiments of the present disclosure may be recorded on a computer-readable recording medium. Corresponding functions can be realized by making the computer system read the programs recorded on the recording medium and execute these programs. The so-called "computer system" herein may be a computer system embedded in the device, and may include an operating system or hardware, such as a peripheral device. The "computer-readable recording medium" may be a semi-conductor recording medium, an optical recording medium, a magnetic recording medium, a recording medium for a short-time dynamic storage program, or any other computer readable recording medium.

Various features or functional blocks of the device used in the above embodiments may be implemented or executed by circuitry (e.g., monolithic or multi-chip integrated circuits). The circuitry designed to perform the functions described in this specification may include general purpose processors, digital signal processors (DSPs), application specific integrated circuits (ASICs), field programmable gate arrays (FPGAs), or other programmable logic devices, discrete gate or transistor logic, discrete hardware components, or any combination of the above devices. The general purpose processor may be a microprocessor or any existing processor, controller, microcontroller, or state machine. The circuit may be a digital circuit or an analog circuit. One or more embodiments of the present disclosure may also be implemented using these new integrated circuit techniques in the event of a new integrated circuit technology that replaces existing integrated circuits due to advances in semiconductor technology.

Further, the present disclosure is not limited to the above embodiments. While various examples of these embodiments have been described, the present disclosure is not limited thereto. Any fixed or immobile electronic devices mounted indoor or outdoor can be used as a terminal device or a communication device, including e.g., AV devices, kitchen devices, cleaning devices, air conditioners, office devices, vending machines and other home appliances.

As described above, the embodiments of the present disclosure have been described in detail with reference to the accompanying drawings. However, the specific structure is not limited to the above-described embodiments, and the present disclosure also includes any design modifications that do not depart from the spirit of the present disclosure. In addition, various modifications may be made to the present disclosure within the scope of the claims, and the embodiments obtained by appropriate combinations of the technical means disclosed in the different embodiments are also included within the technical scope of the present disclosure. In addition, the components having the same effects described in the above embodiments may be substituted for each other.

What is claimed is:

1. A method performed by a terminal in a wireless communication system, the method comprising:
    obtaining listen before talk (LBT) related information including information on at least one LBT priority class;
    transmitting two or more physical uplink shared channels (PUSCHs) on a cell associated with an unlicensed band using resources for a periodic uplink transmission configured via higher layer signaling, based on the LBT related information;
    receiving downlink control information (DCI) including downlink feedback information, the downlink feedback information explicitly indicating two or more hybrid automatic repeat request (HARQ)-acknowledgement (ACK) feedbacks corresponding to the two or more PUSCHs which are transmitted using the resources for the periodic uplink transmission; and
    adjusting a contention window value for an uplink transmission, based on the LBT related information and the two or more HARQ-ACK feedbacks,
    wherein the adjusting of the contention window value comprises:
        in case that at least one of the two or more HARQ-ACK feedbacks indicates an ACK, setting the contention window value for every LBT priority class to a minimum value, and
        in case that all of the two or more HARQ-ACK feedbacks indicate a negative ACK (NACK), increasing the contention window value for every LBT priority class to a next higher allowed value based on the LBT related information.

2. The method of claim 1, wherein the DCI is scrambled with a radio network temporary identifier (RNTI) and a type of the RNTI is defined for the periodic uplink transmission.

3. The method of claim 1, further comprising:
    performing an LBT operation based on the LBT related information and the adjusted contention window value.

4. The method of claim 3, further comprising:
    transmitting an uplink signal on the cell associated with the unlicensed band, based on the performed LBT operation.

5. The method of claim 1, wherein the DCI is for a group of terminals including the terminal.

6. A terminal in a wireless communication system, the terminal comprising:
    a transceiver; and
    at least one processor configured to:
        obtain listen before talk (LBT) related information including information on at least one LBT priority class,
        transmit two or more physical uplink shared channels (PUSCHs) on a cell associated with an unlicensed band using resources for a periodic uplink transmission configured via higher layer signaling, based on the LBT related information,
        receive downlink control information (DCI) including downlink feedback information, the downlink feedback information explicitly indicating two or more hybrid automatic repeat request (HARQ)-acknowledgement (ACK) feedbacks corresponding to the two or more PUSCHs which are transmitted using the resources for the periodic uplink transmission, and
        adjust a contention window value for an uplink transmission, based on the LBT related information and the two or more HARQ-ACK feedbacks,
    wherein, for adjusting the contention window, the at least one processor is further configured to:
        in case that at least one of the two or more HARQ-ACK feedbacks indicates an ACK, set the contention window value for every LBT priority class to a minimum value, and
        in case that all of the two or more HARQ-ACK feedbacks indicate a negative ACK (NACK), increase the contention window value for every LBT priority class to a next higher allowed value based on the LBT related information.

7. The terminal of claim 6, wherein the DCI is scrambled with a radio network temporary identifier (RNTI) and a type of the RNTI is defined for the periodic uplink transmission.

8. The terminal of claim 6, wherein the at least one processor is further configured to perform an LBT operation based on the LBT related information and the adjusted contention window value.

9. The terminal of claim 8, wherein the at least one processor is further configured to transmit an uplink signal on the cell associated with the unlicensed band, based on the performed LBT operation.

10. The terminal of claim 6, wherein the DCI is for a group of terminals including the terminal.

* * * * *